No. 630,395. Patented Aug. 8, 1899.
L. R. McLAIN.
APPARATUS FOR MINING, TRANSPORTING, WASHING, AND DRYING PEBBLE PHOSPHATE.
(Application filed May 13, 1899.)
(No Model.) 3 Sheets—Sheet 3.

Witnesses:
L. C. Hills.
Ewella Dick

Inventor
Louis R. McLain,
By Marcellus Bailey,
his Attorney

UNITED STATES PATENT OFFICE.

LOUIS R. McLAIN, OF ST. AUGUSTINE, FLORIDA.

APPARATUS FOR MINING, TRANSPORTING, WASHING, AND DRYING PEBBLE PHOSPHATE.

SPECIFICATION forming part of Letters Patent No. 630,395, dated August 8, 1899.

Application filed May 13, 1899. Serial No. 716,680. (No model.)

*To all whom it may concern:*

Be it known that I, LOUIS R. McLAIN, of the city of St. Augustine, in the State of Florida, have invented a new and useful Apparatus for Mining, Transporting, Washing, and Drying Pebble Phosphate, of which the following is a specification.

It is my object to provide for the handling and treatment of phosphatic pebble in such manner that the whole operation shall be conducted "automatically," so to speak, and without the interposition of manual labor during the various stages of handling and treatment.

Phosphatic pebble in its natural state is embedded in a matrix of clay, sand, or other material and is overlaid or overburdened with from two to ten feet of barren material, generally sand mixed with sandstone or ironstone. A given area, generally one acre for each pit, is stripped of the overburden by scrapers or any other suitable means, and then actual mining proceeds, the matrix containing the phosphatic pebble being cut down and crumbled up by a stream of water projected against it through a giant nozzle under a pressure of, say, from one hundred and fifty to two hundred pounds. The material as it is mined is removed, and the pit when exhausted becomes a water tank or reservoir on which is floated the dredge that carries the pump—the primary pump—which is used to carry off the material mined from the next pit. A pipe-line is used to convey the material to the shore or solid land, where an auxiliary pump is located to supplement the action of the primary pump and to lift the material through a vertical pipe to a series of suitable washers, rinsers, &c., in which it is taken care of automatically.

With this brief preliminary description I now proceed to a more detailed description of the plant or apparatus in which my invention is embodied, reference being had to the accompanying drawings, the three figures of which represent this completed plant.

The whole operation is a continuous process, and the apparatus is continuous; but owing to the extent of the apparatus or plant the several figures of the drawings are requisite in order to adequately represent the successive parts and steps of the operation.

Figure 1:
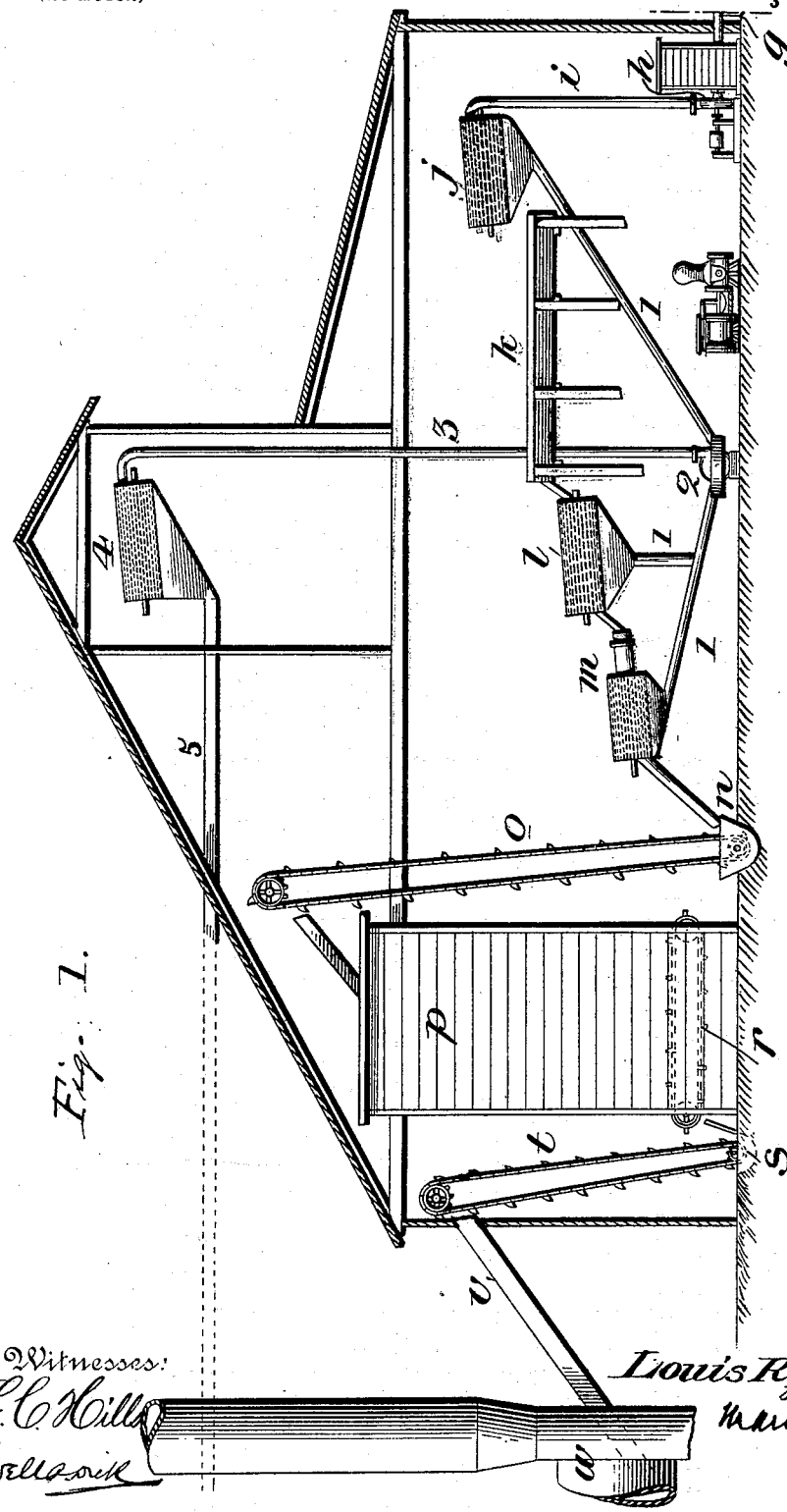
Figure 2:
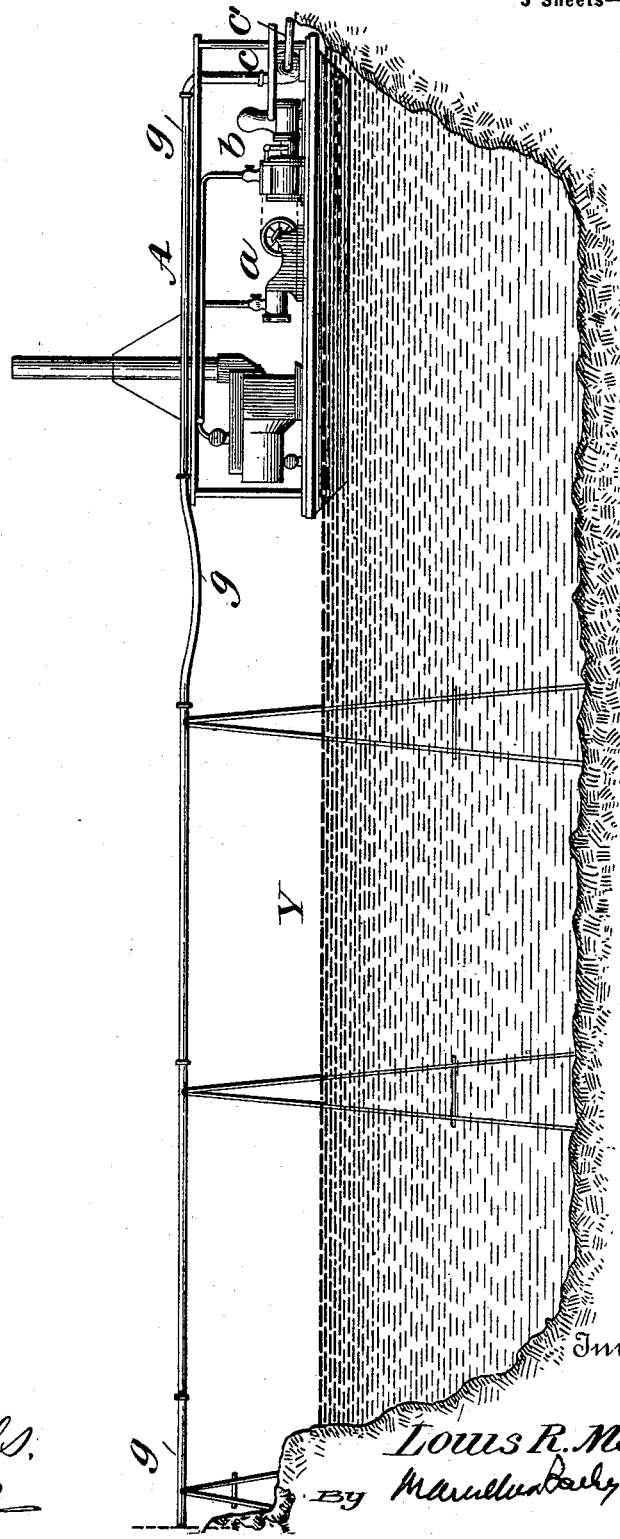
Figure 3:
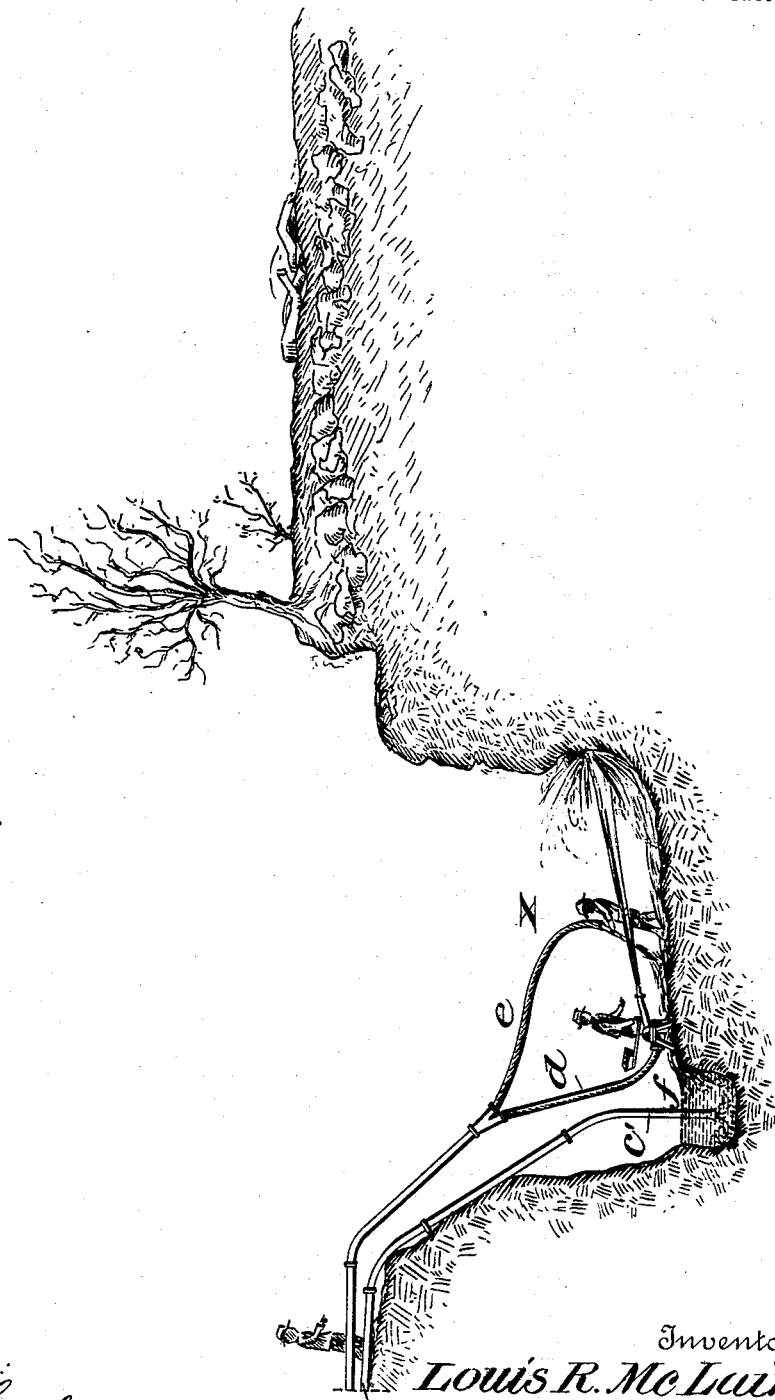

In Figure 2 is represented the dredge A, which floats on the body of the water contained in the exhausted pit Y. X, Fig. 3, is the pit where the mining is being carried on. The dredge carries the steam-engine $a$, that drives the force-pump $b$ and the primary centrifugal pump $c$. With the force-pump are connected the two nozzles $d$ $e$, the former a giant nozzle, by which the mining is effected, the latter an auxiliary nozzle, which assists in washing the mined material into what is called the "sump" $f$, which is a basin or catch-all toward which the bottom of the pit inclines. The matrix containing the pebble phosphate is cut down and crumbled up by the stream of water from the giant nozzle and washes into the sump $f$, in which is submerged the mouth of a suction-pipe $c'$, connected with the primary centrifugal pump $c$. This centrifugal pump, which is usually run at a speed of about four hundred and fifty revolutions per minute, picks up from the sump through the suction-pipe the water, clay, sand, and pebble all mixed together and propels the mixture to the shore end of the plant through the pipe-line $g$. At its shore end the pipe-line $g$ is connected to a centrifugal pump $h$, Fig. 1, which is auxiliary to the primary pump $c$, aiding in sucking the material through the pipe-line, and thence forcing and lifting it through a vertical pipe $i$, through which pipe said material is delivered to suitable apparatus for successively washing, rinsing, and drying it. The preferred arrangement of this portion of the plant is shown in the drawings, Fig. 1. The material is lifted or forced up through the upright pipe $i$ by the second pump $h$ to an elevation of about twenty-one feet and is there discharged into a primary screen $j$, which makes about seventeen revolutions per minute. The muddy water, a part of the sand, and the disintegrated clay wash through the meshes of the screen and are thus separated from the pebble, while the pebble itself falls out through the end of the screen by gravity into a suitable washer $k$, the one shown in the drawings being what is technically known as a "log-washer," making some fourteen revolutions per minute. Fresh or clean water is continuously admitted (by means and connections which I do not deem it necessary to show) to the log-washer to mingle with the material which discharges into the washer from the primary screen $j$. The mixture passes through the washer and discharges therefrom into a second screen $l$, which again separates from the pebble the muddy water and such of the refuse as will pass through the meshes of the screen and discharges the washed pebble into a rinser $m$. This rinser, into which clean water under pressure is admitted by suitable means, is for about two-thirds of its length an imperforate barrel or cylinder, its lower and remaining third being a screen of rather fine mesh. The pebble and water run together through the length of this rinser, the water running off from the pebble through the meshes of the screen portion of the rinser. Thence the pebble, through a suitable chute or guideway, runs into a boot $n$, whence it is taken by an elevator $o$, termed the "wet-rock" elevator, and lifted and discharged into the top of the "wet" bin $p$. In a trough at the bottom of this bin is an endless power-driven chain-drag $r$, which carries the pebble along to the end of the trough, whence it falls into a boot $s$, from which it is taken by an elevator $t$, which lifts it and discharges it through a suitable chute or guideway $v$ into a drier $w$, preferably of the rotating type, in its passage through which the pebble is dried and becomes the finished product, which by suitable means is conveyed to the place of storage or shipment.

All of the muddy water which drains from the screens $j$ $l$ and the rinser $m$ is carried through troughs or conduits 1 to a centrifugal pump 2, which through a pipe 3 lifts it and discharges it into what I term the "debris-screen" 4. This screen has finer meshes than any of the others and catches a considerable quantity of smaller pebble, much of it no larger than a pin's head, which has escaped from the other screens. The pebble thus saved from the debris is dumped through a chute (not shown) into the boot $n$ of the wet-rock elevator $o$, while the muddy water from the debris-screen is discharged into the elevated trough 5, which carries it off and finally disposes of it at a distance from the plant.

The pump, screens, and various other moving parts of the shore end of the plant are of course driven by suitable actuating mechanism, which, however, I have deemed it unnecessary to show.

It will be noted that the whole process is, in effect, entirely automatic. By the primary pump on the dredge and the pipe-line the mined material is transported to the shore, where it is taken by the auxiliary pump, which not only supplements and aids the action of the primary pump, but lifts the material to a point where it is discharged into the washing, screening, and drying portion of the plant, where it is automatically cared for and transferred to the successive machines or devices by which it is acted on. Obviously the particular kind of screens, washers, &c., used, the mesh of such machines used, and the order in which they are used may vary, what is essential being the combination of the primary pump, the pipe-line, the auxiliary pump, and the pipe through which the material is lifted by that pump with apparatus which receives and handles the material thus lifted and effects automatically the separation of the pebble from the debris.

What, therefore, I claim herein as new and of my own invention is as follows:

Apparatus for mining and preparing phosphatic pebble comprising, in connection with means for mining the material, the dredge, primary pump thereon, connections by which said pump takes the mined material from the sump, a pipe-line leading from said pump to the shore end of the apparatus, an auxiliary pump which connects with the shore end of the pipe-line, and also with an upright pipe for lifting the material received through the pipe-line, and apparatus at the upper end of said lifting-pipe which receives the material discharged from said pipe, and automatically separates the pebble from the water and debris mixed with it, substantially, as and for the purposes hereinbefore set forth.

In testimony whereof I have hereunto set my hand this 25th day of April, 1899.

LOUIS R. McLAIN.

Witnesses:
EWELL A. DICK,
E. DUNN TALBERT.